(12) United States Patent
Sobiech et al.

(10) Patent No.: US 9,586,252 B2
(45) Date of Patent: Mar. 7, 2017

(54) COATINGS FOR HIGH-TEMPERATURES USES WITH TRIBOLOGICAL STRESS

(71) Applicant: Oerlikon Surface Solutions AG, Trubbach, Trubbach (CH)

(72) Inventors: Mathias Lukas Sobiech, Wasserburg (DE); Juergen Ramm, Maienfeld (CH)

(73) Assignee: OERLIKON SURFACE SOLUTIONS AG, PFAFFIKON, Pfaffikon SZ (CH)

( * ) Notice: Subject to any disclaimer, the term of this patent is extended or adjusted under 35 U.S.C. 154(b) by 0 days.

(21) Appl. No.: 14/434,783

(22) PCT Filed: Oct. 9, 2013

(86) PCT No.: PCT/EP2013/003022
§ 371 (c)(1),
(2) Date: Apr. 10, 2015

(87) PCT Pub. No.: WO2014/056605
PCT Pub. Date: Apr. 17, 2014

(65) Prior Publication Data
US 2015/0291800 A1 Oct. 15, 2015

(30) Foreign Application Priority Data

Nov. 13, 2012 (DE) .......................... 10 2012 022 114
Dec. 14, 2012 (EP) .................................... 12008340

(51) Int. Cl.
*C10M 103/06* (2006.01)
*B21D 22/02* (2006.01)
(Continued)

(52) U.S. Cl.
CPC ............ *B21D 22/02* (2013.01); *C01G 39/006* (2013.01); *C08K 3/28* (2013.01); *C08K 3/38* (2013.01);
(Continued)

(58) Field of Classification Search
USPC ........... 51/307, 309; 428/336, 697, 698, 699
See application file for complete search history.

(56) References Cited

U.S. PATENT DOCUMENTS 4,465,604 A 8/1984 King
5,360,675 A * 11/1994 Wood ...................... C22C 27/04
428/631

(Continued)

FOREIGN PATENT DOCUMENTS

DE 10 2010 053 751 A1 5/2012
EP 1 712 654 B1 10/2006
WO 2011/095292 A1 8/2011

OTHER PUBLICATIONS

Shin et al "Microstructural evolution and tribological behaviour of MO-Cu_N coatings as a function of Cu content" Mat.Chem&Phy 130 (2011) p. 870-879.*

(Continued)

*Primary Examiner* — Archene Turner
(74) *Attorney, Agent, or Firm* — Pearne & Gordon LLP

(57) ABSTRACT

The present invention relates to a coating for high-temperature uses with tribological stress. The coating comprises a multi-layer system and a top lubricant layer, the top lubricant layer containing molybdenum as a main component.

11 Claims, 2 Drawing Sheets

(51) Int. Cl.
*C10M 103/04* (2006.01)
*C01G 39/00* (2006.01)
*C08K 3/28* (2006.01)
*C08K 3/38* (2006.01)
*C09D 1/00* (2006.01)

(52) U.S. Cl.
CPC ............. *C09D 1/00* (2013.01); *C10M 103/04* (2013.01); *C10M 103/06* (2013.01); *C08K 2003/382* (2013.01); *C10M 2201/053* (2013.01); *C10M 2201/061* (2013.01); *C10M 2201/062* (2013.01); *C10M 2201/0613* (2013.01); *C10N 2210/01* (2013.01); *C10N 2210/04* (2013.01); *C10N 2210/05* (2013.01); *C10N 2210/06* (2013.01); *C10N 2230/06* (2013.01); *C10N 2230/08* (2013.01); *C10N 2230/14* (2013.01); *C10N 2240/10* (2013.01); *C10N 2240/14* (2013.01); *C10N 2240/40* (2013.01); *C10N 2240/401* (2013.01); *C10N 2240/402* (2013.01); *C10N 2240/404* (2013.01); *C10N 2240/407* (2013.01); *C10N 2240/58* (2013.01); *C10N 2250/14* (2013.01); *C10N 2250/141* (2013.01)

(56) References Cited

U.S. PATENT DOCUMENTS

| | | | | |
|---|---|---|---|---|
| 6,095,126 | A * | 8/2000 | Kloft | C23C 4/08 75/255 |
| 7,056,602 | B2 * | 6/2006 | Horling | C23C 14/0641 428/697 |
| 7,083,868 | B2 * | 8/2006 | Horling | C23C 14/06 428/697 |
| 2004/0076856 | A1 * | 4/2004 | Hugosson | C23C 14/0635 428/698 |
| 2013/0303414 | A1 * | 11/2013 | Ramm | C23C 14/0084 427/585 |

OTHER PUBLICATIONS

Gulbinski et al "Thin films of MoN/Ag nanocomposite-the structur, mechanical and tribological properties" Surf. & Coat. ech. 201 (2006) p. 1469-1476.*

Susko et al "Om2N/Cu think films-the structure,mechaical and tribological properties" Surf. & Coat. Techn. 200 (2006) p. 6288-6292.*

International Search Report for PCT/EP2013/003022 dated Jan. 8, 2014.

Suszko, et. al., "The Role of Surface Oxidation in Friction Processes on Molybdenum Nitride Thin Films", Surface and Coatings Technology, Elsevier, Amsterdam, NL, vol. 194,No. 2-3, May 1, 2005, pp. 319-324.

Pappacena, et. al., "Residual Stresses, Interfacial Adhesion and Tribological Properties of MoN/Cu Composite Coatings", Wear, Elsevier Sequoia, Lausanne, CH, vol. 278, Jan. 3, 2012, pp. 62-70.

Ozturk, et. al., "Comparative Tribological Behaviors of TiN?, CrN? and MoN?Cu Nanocomposite Coatings", Tribology International, Butterworth Scientific Ldt, Guildford, GB, vol. 41, No. 1, Sep. 18, 2007, pp. 49-59.

* cited by examiner

COATINGS FOR HIGH-TEMPERATURES USES WITH TRIBOLOGICAL STRESS

The present invention relates to wear resistance coatings for components, parts and tools that are exposed to high temperatures during use. Components, parts and tools are designated hereafter together as substrates.

AIM OF THE INVENTION

Applications at "high" temperatures pose extreme challenges to the surface functionality of parts, components and tools in terms of their mechanical, structural and chemical stability. In order to attain a surface functionality that is stable over the long term and thus ensure the productivity of the industrial process, the present invention proposes hard material layer systems for parts, moving components as well as shaping and cutting tools, that improve in a satisfactory manner the wear and tear of the components and tools in different industrial applications with clearly increased heat stresses (i.e. temperatures of over 400° C., hereinafter called high-temperature uses). The fundamental properties of these hard material layer systems stable at high-temperatures are as follows: i) sufficient protection against abrasive wear, ii) sufficient protection against adhesive wear, iii) sufficient layer adhesion and iv) sufficient temperature stability (phase stability and resistance to oxidation).

DESCRIPTION OF THE INVENTION

According to the invention, a coating system is proposed which essentially comprises a multi-layer coating system as a basis. On this multi-layer coating system, a top smear coating system with at least one layer is provided. This top smear coating system finishes off the coating system externally. The top smear coating system contains molybdenum as its main component and, depending on the prevailing high temperature tribological contact and the mechanical and chemical stress of the surface resulting therefrom, can have an appropriate architecture/microstructure as well as a suitable composition.

Hereinafter, more details regarding the preferred architecture/microstructure and composition will be provided. To simplify, the top smear coating system is also called top smear layer.

Figure 1:
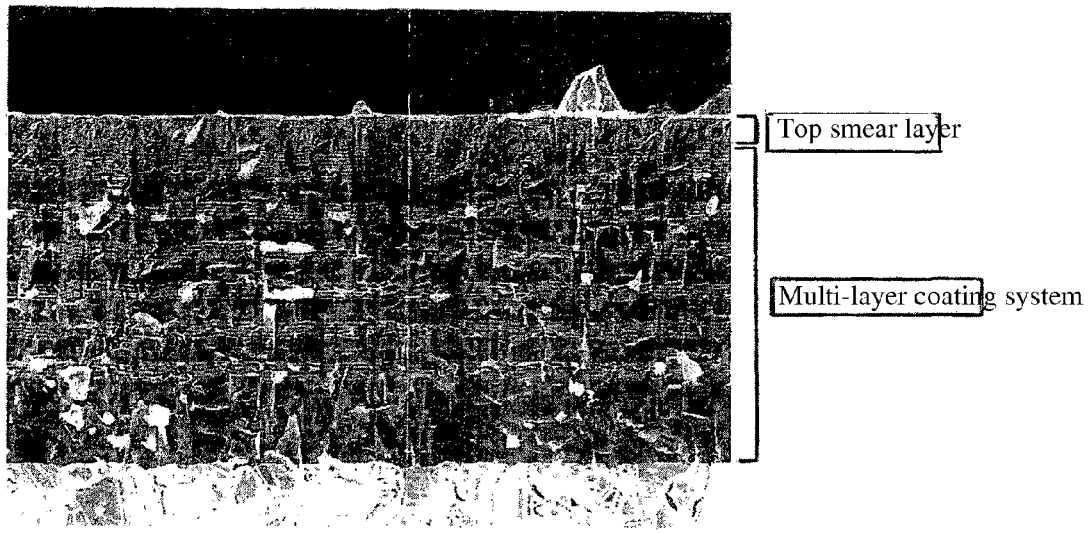
FIG. 1 shows an inventive coating.
Figure 2:
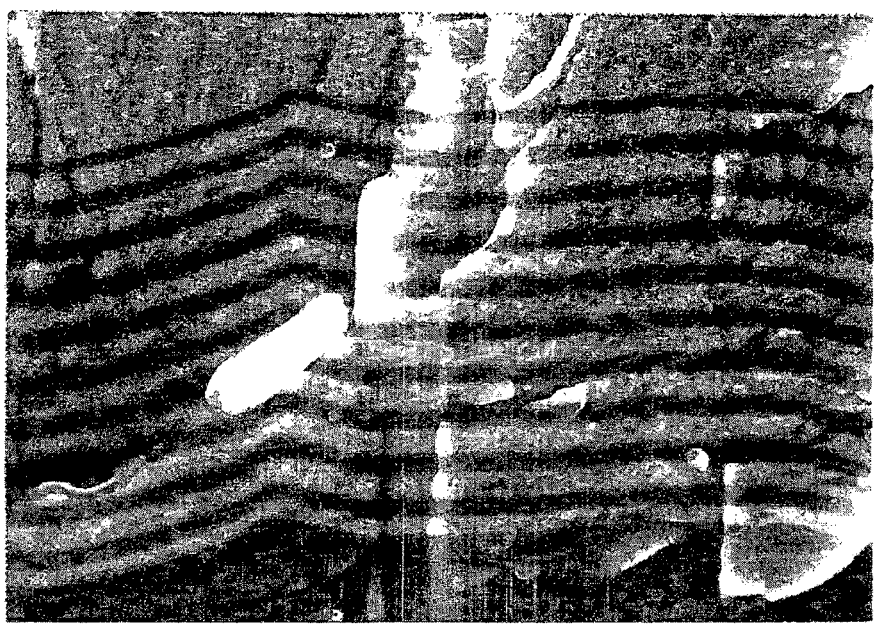
FIG. 2 shows a detail of an inventive coating (nanolayers)
Figure 3:
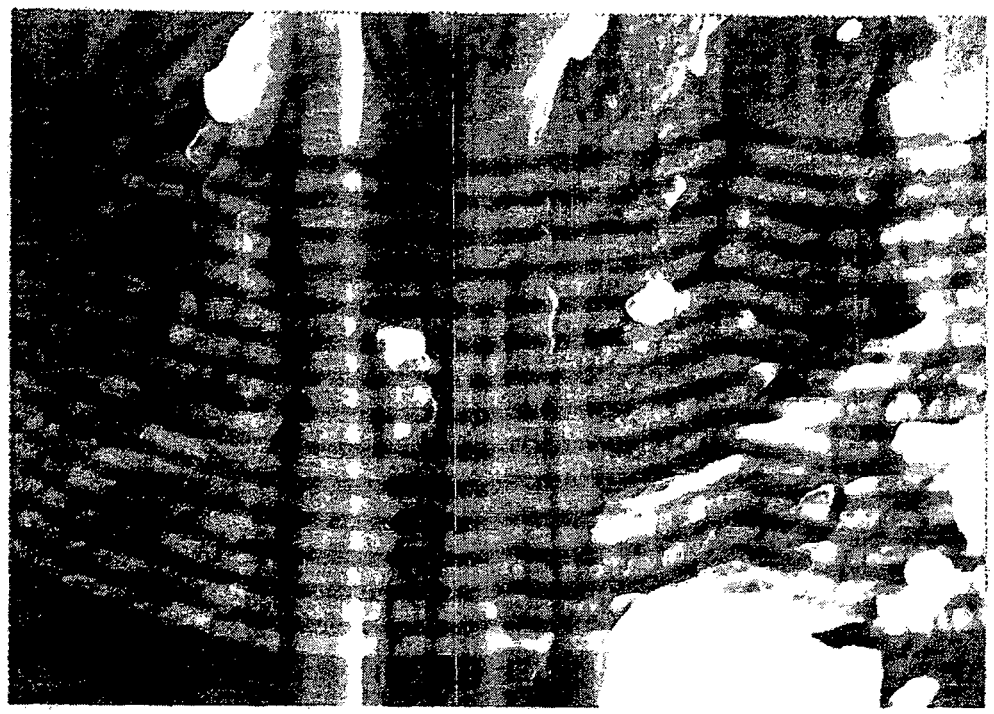
FIG. 3 shows a detail of an inventive coating (nanolayers).

The architecture of this top smear layer can be characterized by i) a mono-layer configuration, ii) a bi-layer configuration, iii) a multi-layer configuration or iv) a nanolaminated configuration, wherein in case ii)-iv) the microstructure or the chemistry can be modified by means of the configuration. Gradations in the microstructure and/or the composition are however possible and appropriate in all cases i)-iv) in order to provide the lubricating behavior for the respective application in relation to the required mechanical properties. In all cases, the layers are essentially of a nanoscale nature.

The chemical composition of the top smear layer is generally characterized as follows: $Mo_2$—$X_b$—$Y_c$, wherein a, b and c indicate the atomic concentration of the respective components and $a+b+c=1$, and molybdenum is implemented as the dominating component, i.e. $0 \leq b < a$ and $0 \leq c < a$, with X being the variable metal component: B, Si, V, W, Zr, Cu and Ag or a combination thereof, with Y as variable non-metallic component: C, O and N or a combination thereof.

Top smear layers with the following compositions are particularly preferred for high-temperature applications above 500° C.:

Mo and/or Mo—Cu
Mo—N and/or Mo—Cu—N
Mo—O—N and/or Mo—Cu—O—N
Mo—Si—B and/or Mo—Si—B—N
Mo—Si—B—O—N The top smear layer preferably contains at least 95 at % molybdenum. Even more preferably, the top smear layer does not contain any aluminum. The layer thickness of the top smear layer is advantageously between 0.25 and 1.5 µm, even more advantageously between 0.5 and 1.0 µm.

In a preferred manner, a suitable pair of top smear layer and underlying coating system is evaluated for a specific high-temperature application (temperature, tribological contact, surrounding atmosphere and duration).

Hereinafter, the interaction of a Mo—X—Y top smear layer with an underlying multi-layer coating system will be explained by way of example. The mechanism of action of the top smear layer in combination with the underlying multi-layer coating system in respect of the mechanical, structural and chemical composition for various high-temperature applications can probably be described as follows: whilst the top smear layer is used exclusively in the initial stage of the tribological contact, in that this smear layer is continuously used at increased temperatures under formation of a solid lubricant phase (particularly metal oxides) and the tribological run-in behavior is optimized (i.e. the initial tribological contact is optimally conditioned for the further process), the underlying multi-layer coating system (after the surface conditioning has been performed through the top smear layer) becomes responsible for maintaining a protection (abrasive and adhesive) wear and tear protection that is long-lasting and stable at high temperatures. It must be assumed that at temperatures from approx. 400° C., the oxidation of the top smear layer starts (depending on the exact micro-structure and composition). The oxidation of the metals contained in the top smear layer, such as B, V, W, Zr, Cu, Ag and Mo, can result in the formation of so-called "Magnéli phases". It is known that such Magnéli phases have excellent lubricating properties (solid body lubrication). The underlying multi-layer coating system on the other hand, thanks to its architecture in tandem with the coating layer chemistry, provides not only the required mechanical, structural and chemical high-temperature stability but also the desirable and in the present case controllable formation of solid lubricant phases (especially metal oxides; it can result in the formation of so-called "Magnéli phases") in a stable long-term use at high temperatures up to 1000° C.

According to the invention, the multi-layer coating system comprises at least one layer stabilized for high temperatures (HT layer). One of these can correspond for example to (Me1, Me2, Mo)N.

In a particularly preferred embodiment of the present invention, the multi-layer coating system comprises at least two layer packets in which, as the distance from the substrate increases, an actively lubricating layer follows on a HT layer. An actively lubricating layer can correspond to the HT layer, yet be formed with an increased proportion of molybdenum. The layers low in molybdenum accordingly would form the HT layers whilst the molybdenum-rich layers can form the lubricating layers. Preferably, the maximum molybdenum concentration in the molybdenum-rich layers is at least 10 at %, even more preferably at least 20 at % over the minimum molybdenum concentration of the neighboring layers low in molybdenum. The molybdenum-rich layers of the alternating layer system can be deposited for example by means of a PVD process using individual component material sources (targets) as well as by means of a PDV process using multi-components material sources.

The molybdenum-rich layers of the alternating layer system can contain one or several further elements from the group comprising C, O, B, Si, V, W, Zr, Cu and Ag in order to further improve lubrication.

The layers low in molybdenum of the alternating system can contain one or several further elements from the group comprising B, Si, W and Zr and their combinations in order to further improve the high-temperature stability, e.g. by improving the mechanical and chemical properties.

According to the invention, a top smear layer as indicated above is applied on this multi-layer coating system.

Inventive substrates, i.e. substrates coated with the inventive coating system, can advantageously be used anywhere where high temperatures and tribological stress might arise during use. This is for example the case for direct press hardening. By way of example, the following are mentioned:

Direct press hardening of Al—Si coated 22MnB5 USSH sheets

Direct press hardening of uncoated 22MnB5 USSH sheets

Further examples of applications are forging of high-strength metal sheets cutting and deformation in particular of high-strength titanium and nickel alloys components and moving parts in internal combustion engines and in the field of turbochargers aluminum and magnesium die casting injection molding and extrusion especially of high-strength plastics or aluminum According to a first embodiment of the present invention, a 2 µm thick $(Ti_{0.5}Al_{0.5})N$ layer is applied onto a hard-press forming tool. This is followed by 5 layer packets, wherein each layer packet comprises a 0.5 µm thick $(Ti_{0.3}Al_{0.3}Mo_{0.4})N$ layer, followed by a 0.5 µm thick $(Ti_{0.5}Al_{0.5})N$ layer. A 0.5 µm thick $(Ti_{0.3}Al_{0.3}Mo_{0.4})N$ layer completes this multi-layer coating system. The overall coating system, on the other hand, is completed with a 0.5 µm thick $Mo_{0.05}Si_{0.03}B_{0.02}$ as top smear layer. In this concrete case, MoN and $Mo_{0.05}Cu_{0.05}N$ are particularly relevant as suitable top smear layers.

According to a second embodiment of the present invention, a 2 µm thick $(Al_{0.65}Cr_{0.25}Si_{0.05})N$ layer is applied onto a hard-press forming tool, wherein Si can optionally also be omitted. This is followed by 5 layer packets, wherein each layer packet comprises a 0.5 µm thick $(Al_{0.42}Cr_{0.18}Mo_{0.35}Cu_{0.05})N$ layer, followed by a 0.5 µm thick $(Al_{0.7}Cr_{0.3})N$ layer. A 0.5 µm thick $(Al_{0.42}Cr_{0.18}Mo_{0.35}Cu_{0.05})N$ layer completes this multi-layer coating system. The overall coating system, on the other hand, is completed with a 0.5 µm thick MoN as top smear layer.

Particularly preferred is a coating with a multi-layer coating system comprising compounds (C and/or N and/or O) of Al and B and the elements of the IV and V subgroup on the one hand and Mo compounds (C and/or B and/or N and/or O) on the other hand, and with a top smear layer containing a Mo compound with Mo as main component, and with a thickness that is the same, or preferably greater, than the molybdenum-containing layers in the multi-layer.

Particularly preferred is the coating with the multi-layer coating system as above, wherein the integral proportion of Mo to the total proportion of the metals is less than 50 at %.

Further experiments have led to the following characteristics of particularly preferred embodiments of the present invention:

The actively lubricating layers (TiAlMoN) advantageously have an (averaged; when measured by EDX at 10 kV) Mo content of 20-60 mat %, preferably 25-35 at %, even more preferably 30 at %.

The (averaged) Mo content may also be controlled via the architecture (nano-layer structure) of the actively lubricating layers (see pictures below). This can be achieved technically by using 2 target types (Mo and TiAl) through i) a change in the rotational speed and/or ii) a change of the target parameters of all targets running simultaneously.

The thickness of the MoN-rich layers in the TiAlMoN (light layers in the nano-layer) may vary between 10-60 nm, preferably between 20-50 nm, more preferably between 30-40 nm. The optimum thickness of the MoN-rich layers in TiAlMoN seems to be about 40 nm.

A Mo content of about 30 at % in the actively lubricating layers (TiAlMoN) can at temperatures of 800-900° C. very advantageously promote surface oxidation (without adversely affecting the total layer structure), so that sufficient (oxide) lubricant is always provided in order to prevent a smearing of AlSi during long-term use. This has been shown by application-focused tests (e.g. HT-SRV test with continuous change of Usibor@-sheet with the same layer being always tested).

Very advantageous is also the fact that when the Mo content is varied in the range of 20-40 at % in the actively lubricating layers (TiAlMoN), the mechanical properties (hardness, modulus of elasticity, adhesion), the structural properties (phase composition) as well as the oxidation properties (growth of an oxide layer at 800° C. for 1 h in ambient atmosphere) of the overall layer are not significantly altered. This allows the targeted architecture and composition for various HT applications in terms of resistance against abrasive and adhesive wear and tear to be optimized.

What is claimed is:

1. Coating with a multi-layer coating system and a top smear layer, wherein the multi-layer coating system contains at least one HT layer and the top smear layer has a composition according to $Mo_a—X_b—Y_c$, wherein a, b and c indicate the atomic concentration of the respective components, and $a+b+c=1$, and $0 \leq b < a$ and $0 \leq c < a$, with X being the variable metal component: B, Si, V, W, Zr, Cu and Ag or a combination thereof, with Y as variable non-metallic component: C, O and N or a combination thereof, wherein the multi-layer coating system comprises at least one actively lubricating layer, characterized in that the at least one actively lubricating layer is a Ti—Al—Mo—N layer that has an averaged Mo content when measured by EDX at 10 kV of 20-60 mat %.

2. Coating according to claim 1, wherein the actively lubricating layer has an averaged Mo content when measured by EDX at 10 kV of 25-35 at %.

3. Coating according to claim 1, wherein the actively lubricating layer has an averaged Mo content when measured by EDX at 10 kV of 30 at %.

4. Coating according to claim 1, characterized in that the at least one actively lubricating layer is formed of nano-layers with MoN-rich nano-layers and nano-layers poor in MoN.

5. Coating according to claim 4, characterized in that the thickness of the MoN-rich nano-layers are between 10-60 nm.

6. Coating according to claim 5, wherein the thickness of the MoN-rich nano-layers are between 20-50 nm.

7. Coating according to claim 5, wherein the thickness of the MoN-rich nano-layers are between 30-40 nm.

8. Coating according to claim 5, wherein the thickness of the MoN-rich nano-layers are 40 nm.

9. Coating according to claim 4, characterized in that the MoN-rich nano-layers are between 20-50 nm.

10. Coating according to claim 4, characterized in that the MoN-rich nano-layers are between 30-40 nm.

11. Coating according to claim 4, characterized in that the MoN-rich nano-layers are 40 nm.

* * * * *